United States Patent Office 3,290,282
Patented Dec. 6, 1966

3,290,282
FIBER-REACTIVE DYES
Erik Kissa, Wilmington, Del., assignor to E. I. du Pont de Nemours and Company, Wilmington, Del., a corporation of Delaware
No Drawing. Filed May 21, 1963, Ser. No. 282,174
7 Claims. (Cl. 260—146)

This invention relates to fiber-reactive dyes and to methods for preparing these dyes.

In the dyeing of textiles and other materials which possess reactive radicals such as —OH, —NH, or —NH₂ in their molecules or micelles, it is a common practice to use a dye which reacts with the aforementioned radicals, and as a result of such reaction the dye is chemically attached to the material being dyed. Well-known materials which will chemically react with fiber-reactive dyes are cotton, paper, leather, wool, silk, nylon, and polyvinyl alcohol film.

According to the present invention, new chemical compounds are produced which may be used as reactive dyes on fiber or other organic materials as aforementioned. These new chemical compounds may be expressed by the general formula

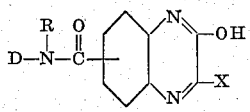

wherein X is chlorine or bromine, and D is a radical of a dye chromophore having an acylatable amino group —NR— in which R is hydrogen, a C₁-C₄ alkyl, 2-hydroxyethyl, 2-cyanoethyl, or 2-sulfatoethyl (free acid or water-soluble salt.

It will be seen from the above formula that the dye chromophore is attached to a quinoxaline ring through a carbonyl group and the quinoxaline ring is further substituted with a chlorine or bromine and a hydroxyl group. The hydroxy group has a direct effect upon the solubility of the dye. It has been found that when this group is present in the structure, as shown, the dyes tend to be highly soluble. The other substituent on the quinoxaline ring, that is, the chlorine or bromine radical, is likewise an essential feature of the present invention. It is the chlorine or bromine radical on the quinoxaline ring that renders the dye fiber reactive. When a fiber containing a hydroxyl or an amino group is contacted with a solution of the dye of this invention in the presence of alkali, a chemical reaction occurs at the reactive sites on the dye and the fiber, and the dye becomes chemically bonded to the fiber. These dyes are useful in applications where it is customary to use fiber-reactive dyes, and particularly in those applications where a dye having high solubility and/or hydrolytic stability to alkali, and/or high reactivity in acid is required.

The novel dyes of this invention are prepared by selective alkaline hydrolysis of dihaloquinoxalinecarbonylamino dyes of the general structure

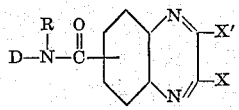

wherein D, R, and X have the same meanings as above and X' is either chlorine or bromine.

The preparation of these latter dihalogen compounds is described in the prior art. The factors that are important in obtaining the selective alkaline hydrolysis of the dihalo compounds are time, temperature, and pH. The exact conditions will vary from dye to dye but for a given dye these conditions can be readily determined from a study of the rate of alkaline hydrolysis of the dihalogen starting material. For example, an aqueous solution of alkali set at a pH above 8 may be prepared and while the temperature of this solution is constant, the dihalogen starting material may be maintained in the alkaline solution until both halogen atoms are hydrolyzed from the quinoxaline ring. During this period when the dihalogen starting material is undergoing hydrolysis in the aqueous alkali, samples are taken at periodic intervals, and they are analyzed to determine percentage of hydrolyzable chlorine or bromine, as the case may be. By plotting the percent of hydrolyzable chlorine or bromine versus time, one is able to determine from the sharp break in the curve obtained the length of time that the particular dihalogen starting material must remain in the aqueous alkali solution to produce the chloro (or bromo) hydroxyquinoxalinecarbonylamino dye. For convenience, a temperature between 25°–50° C. and a pH of 10–12 is recommended for the hydrolysis. Under these conditions, most of the starting materials of this invention will form the hydroxy derivative in a period ranging from 10 minutes to 48 hours. Any alkali which will give the desired pH can be used; for example, NaOH, LiOH, KOH, Na₂CO₃, Na₂SiO₃, and sodium triphosphate. Some alkalies such as potassium hydroxide will cause dyes containing sulfonic groups to be less soluble due to the conversion of the sulfonate group to the corresponding metal salt.

The application of the dyes of this invention to organic materials containing OH, NH, or NH₂ groups is accomplished by contacting the material with an aqueous medium containing the dye and then subjecting the contacted material to heat treatment. Prior to the heating, the material must also be impregnated with an alkali solution, for example, a 2–5% solution of Na₂CO₃ and/or NaOH. Impregnation with the alkali may be effected either prior to, simultaneously with, or subsequent to the contacting of the material with the aqueous dye solution.

In the padding operations, a one- or two-step process can be employed as follows:

One step:
    Pad with dye and alkali, optionally dry cure at 270°–425° F. for 30 sec. or more wash.
Two step:
    Pad with dye, optionally dry,
    Pad with salt solution of alkali, optionally dry,
    Cure at 270°–425° F. for 30 sec. or more wash.

As previously mentioned, the alkali in the above procedures may be a 2–5% solution of sodium carbonate and/or sodium hydroxide. The salt in the two-step process may be either sodium chloride or sodium sulfate. The two-step procedure using sodium sulfate (in an amount of 200–300 g./l.) is preferred. In printing operations, these dyes are very suitable for use in the thermal process wherein the printing paste contains both the dye and alkali and the print is cured by heating above 270° F. for 30 seconds or more before scouring (washing).

When the novel dyes of this invention are applied to wool and nylon by the ordinary dyeing procedures recognized for these fibers, that is, from a hot dilute acidic bath as is customary in the art of dyeing with acid dyes, attractive dyeings are obtained.

For a better understanding of the invention, the following specific examples are given. These examples are intended to be merely illustrative of the invention and not in limitation thereof. Unless otherwise specified, all parts are by weight.

Example I

Ten parts of a red dye of the structure

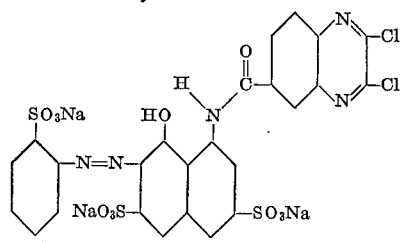

is dissolved in 250 parts of water. The pH of the solution is adjusted to 12 by the addition of 250 parts of 1.0 N sodium hydroxide solution at 25° C. The addition of the caustic is accompanied by rapid stirring which is continued until the dye is salted out. After 30 minutes, the reaction is cooled to 10° C., neutralized to pH 7 with sulfuric acid. The red dye of the structure

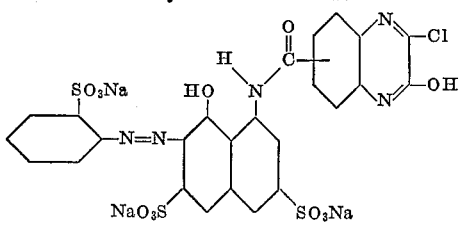

is isolated by salting with sodium chloride, filtering, washing with an acetone-water mixture, and drying. A dye bath containing 40 g./l. of isolated product is padded at 85% pick-up on to poplin which is then dried and re-padded with a solution of sodium hydroxide (10 g./l.) and sodium sulfate (200 g./l.). The fabric is then cured at 325° F. for 90 seconds and scoured. The dyeing obtained is a very bright red shade characterized by good light- and wash-fasteness properties.

Chromotography of the dye on paper using an 85:15 acetone:water mixture shows two major bands, both of which can be fixed by heating in the presence of alkali showing that both the 6- and 7-isomers are present in the product.

On analysis, the product showed a 5:3:1 ratio of N:S: hydrolyzable Cl.

Example II

Forty parts of the dye of the structure

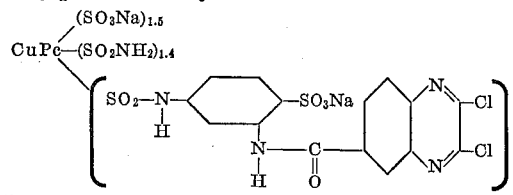

is dissolved in 250 parts of water and 50 parts of 3 N sodium hydroxide is added to give a pH of 12. The addition of the caustic is accompanied by rapid stirring which is continued until the dye is salted out. After 20 minutes, the reaction is cooled, neutralized, and salted with sodium chloride. The product of the structure

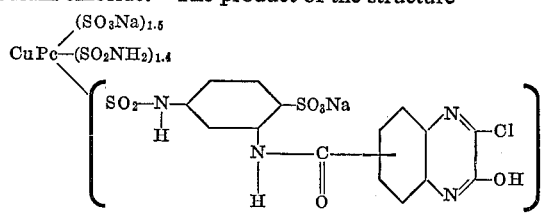

is filtered and dried. When a 30 g./l. solution of the resulting turquoise dye containing 5 g./l. of sodium hydroxide is padded on to poplin at 80% pick-up, immediately cured at 425° F. for 60 seconds and then scoured, there results a bright turquoise dyeing which is fast to washing.

Example III

Twenty parts of a blue dye of the structure

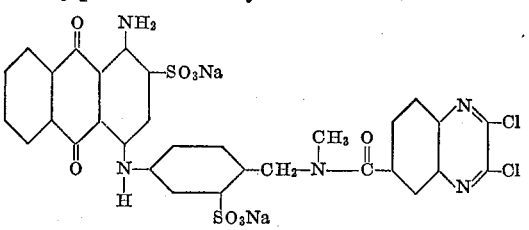

is dissolved in 300 parts of water and 10 parts of sodium carbonate is added. The addition of sodium carbonate is accompanied by stirring which is continued until the dye is salted out. The solution is heated to 50° C., held for 3.5 hours, cooled and neutralized with hydrochloric acid. On salting with sodium chloride, filtering, and drying there results a blue solid of the structure

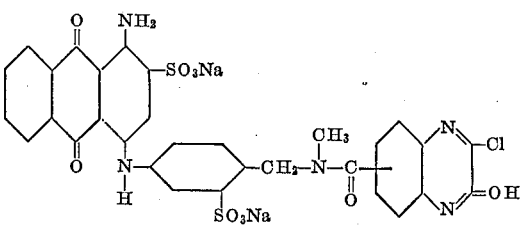

with a N:hydrolyzable chlorine ratio of 5.1:1. The dye produces bright blue dyeing when it is applied by the application method described in Example I.

Example IV

Eighty parts of the dye of the structure

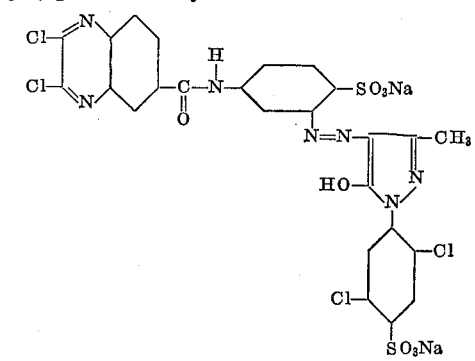

is dissolved in 200 parts of water at 25° C. To this yellow solution is added 4 parts of sodium hydroxide. The resulting alkaline solution is stirred for 15 minutes, cooled, neutralized with sulfuric acid, and salted with sodium chloride to afford a yellow dye of the structure

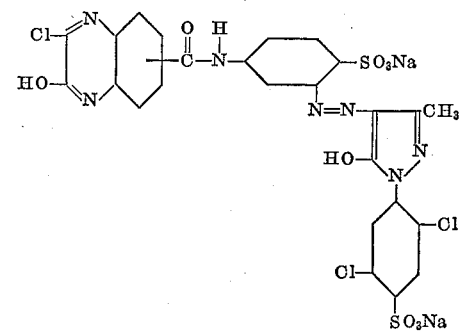

When a print paste containing 30 parts of the above dye
200 parts urea
220 parts water
500 parts of a 4% sodium alginate aqueous paste
10 parts sodium carbonate
40 parts sodium m-nitrobenzenesulfonate is printed on cotton, which is then dried, cured for 60 seconds at 375° F., and scoured, one obtains bright greenish yellow prints having excellent wash- and lightfastness properties. When this yellow dye is chromatogramed as in Example I, there again are two major bands resulting from the fact that both the 6- and 7-isomers are present in the product.

*Example V*

Forty parts of the rubine dye of the structure

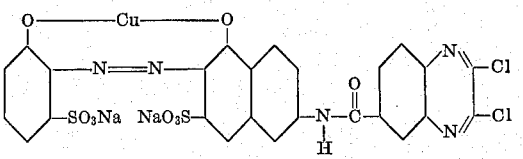

is dissolved in 200 parts of water containing 5 parts of sodium carbonate. This solution is heated at 35° C. for 10 hours, cooled, neutralized with sulfuric acid, and salted with sodium chloride. The precipitated dye of the structure

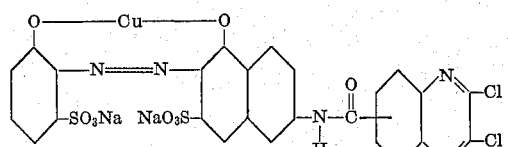

gives bright rubine shades when applied by the method set forth in Example I.

*Example VI*

Thirty parts of the dye of the structure

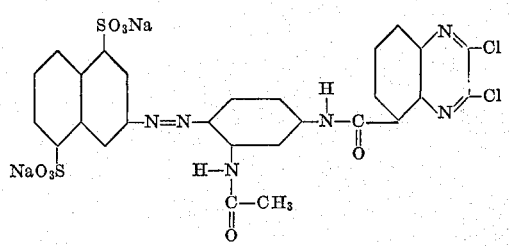

is dissolved in 250 parts of water containing 5 parts of sodium hydroxide. The resulting alkaline solution is stirred for 48 minutes, cooled to 10° C., neutralized with sulfuric acid, and salted with sodium chloride, whereupon a yellow dye is obtained.

Chromotography of the dye on paper using an 85:15 acetone:water mixture shows two major bands, both of which can be fixed by heating in the presence of alkali showing that both the 5- and 8-isomers are present in the product.

On analysis, this dye has a 1:5.8:2 ratio of Cl:N:S. Application of this dye to cotton by the above-described double pad thermal method gives bright yellow dyeings.

The above examples illustrate the production of chlorohydroxyquinoxalinecarbonylamino dyes wherein the dye chromophore can be an azo, a metallized azo, an anthraquinone, or a phthalocyanine chromophore. The choice of the dye chromophore is not critical to the invention, and any of the dichloroquinoxalinecarbonylamino dyes dislosed in the prior art or in my copending application Serial No. 252,056 can be hydrolyzed in accordance with the present invention.

Although the examples illustrate the invention with respect to chlorohydroxyquinoxalinecarbonylamino dyes, the invention is equally applicable to the production of the corresponding bromo derivatives by hydrolyzing in accordance with the proceduce of this invention dibromoquinoxalinecarbonylamino dyes. It is also within the scope of this invention to hydrolyze dihalogenquinoaxlinecarbonylamino dyes wherein one of the halogens of the molecule is chlorine and the other is bromine.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. Fiber-reactive dye of the formula

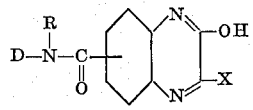

where X is selected from the group consisting of chlorine and bromine; R is selected from the group consisting of hydrogen and $C_1$-$C_4$ alkyl radicals, and D is the radical of a water soluble dye chromophore selected from the group consisting of azo, metallized azo, anthraquinone and phthalocyanine dye chromophores.

2. Fiber-reactive dye according to claim 1 where X is chlorine, and R is hydrogen.

3. Fiber-reactive dye of the formula

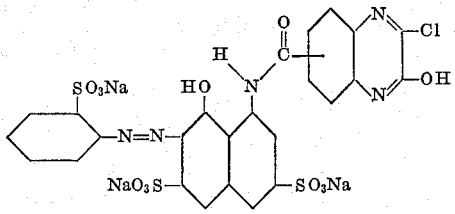

4. Fiber-reactive dye of the formula

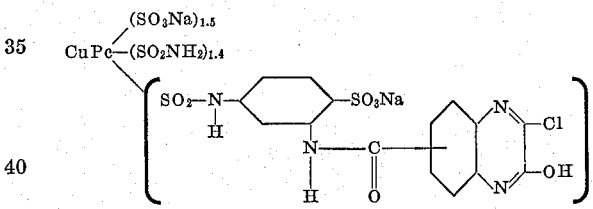

5. Fiber-reactive dye of the formula

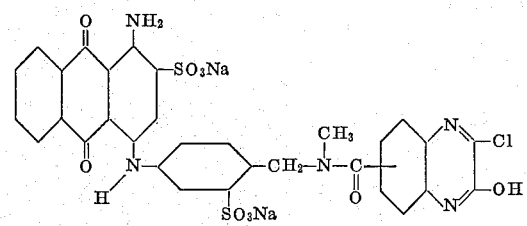

6. Fiber-reactive dye of the formula

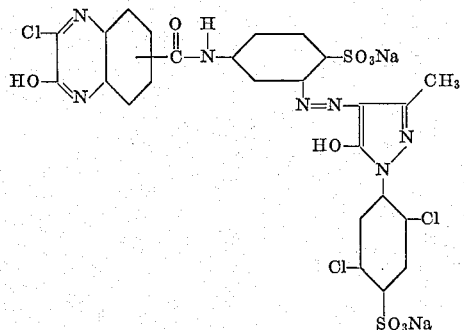

7. Fiber-reactive dye of the formula

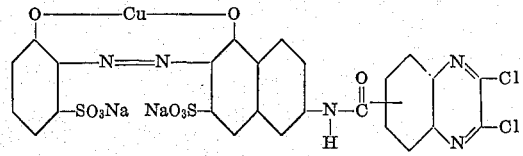

(References on following page)

References Cited by the Examiner

UNITED STATES PATENTS

| | | | |
|---|---|---|---|
| 1,886,480 | 11/1932 | Haller et al. | 260—153 |
| 2,891,941 | 6/1969 | Fasciati et al. | 260—153 |
| 2,953,560 | 9/1960 | Baker et al. | 260—153 |

OTHER REFERENCES

Siegel et al. "Union of South Africa," May 5, 1962, 72 pp. spec., pp. 1–7, 14 and 15 relied on.

CHARLES B. PARKER, *Primary Examiner.*

R. J. FINNEGAN, F. D. HIGEL, *Assistant Examiners.*

UNITED STATES PATENT OFFICE
CERTIFICATE OF CORRECTION

Patent No. 3,290,282 December 6, 1966

Erik Kissa

It is hereby certified that error appears in the above numbered patent requiring correction and that the said Letters Patent should read as corrected below.

Column 1, line 34, for "salt" read -- salt) --; column 2, line 37, for "soluion" read -- solution --; column 3, line 37, for "wash-fasteness" read -- wash-fastness --; column 5, lines 23 to 29, for the extreme lower right-hand portion of the formula reading "Cl" read -- OH --.

Signed and sealed this 19th day of September 1967.

(SEAL)
Attest:

ERNEST W. SWIDER
Attesting Officer

EDWARD J. BRENNER
Commissioner of Patents